Dec. 19, 1922.

C. D. BAKER.
AUTOMOBILE FENDER CLAMP GUARD.
FILED JAN. 6, 1922.

1,439,599.

Inventor
C. D. Baker
By
Attorney

Patented Dec. 19, 1922.

1,439,599

UNITED STATES PATENT OFFICE.

CHARLES D. BAKER, OF CADES, SOUTH CAROLINA.

AUTOMOBILE FENDER-CLAMP GUARD.

Application filed January 6, 1922. Serial No. 527,326.

*To all whom it may concern:*

Be it known that I, CHARLES D. BAKER, a citizen of the United States, residing at Cades, in the county of Williamsburg and State of South Carolina, have invented certain new and useful Improvements in Automobile Fender-Clamp Guards; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates more particularly to the mud-guard or fender portion of automobiles. It has for its object to provide for the bracket and clamp by which the fender is supported and braced, a guard or shield which will prevent the bracket and clamp or parts thereof from coming in contact with the wheel-tire in vibrations of the fender which if permitted has a tendency to cut or puncture the tire. To the accomplishment of the purpose stated, the invention consists in a guard or shield having the features of construction hereinafter specified which makes possible the easy application of the guard to the fender brackets and clamps already in use, particularly in cars of the Ford type, and when applied will effectually cover the clamp and bracket where attached to the fender so that in vibrations of the fender the bracket and clamp will be prevented from knocking and cutting or puncturing the tire, and will also serve to prevent a non-skid chain on the wheel from becoming entangled with the bracket and clamp.

To the accomplishment of the foregoing and such other objects as may hereinafter appear the invention consists in a guard or shield having the features hereinafter described and then sought to be clearly defined, reference being had to the accompanying drawing forming a part hereof, and in which—

Figure 1:
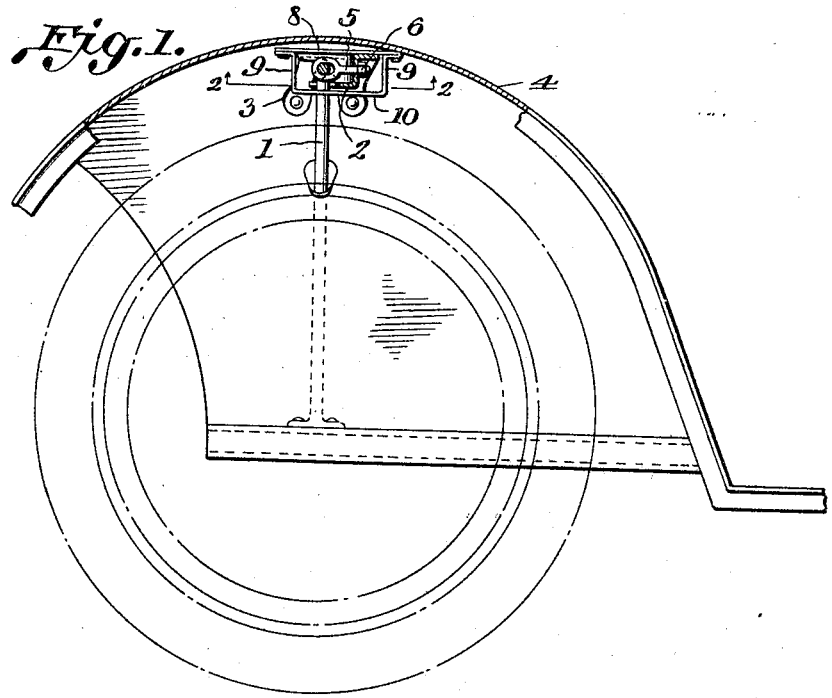
Figure 2:
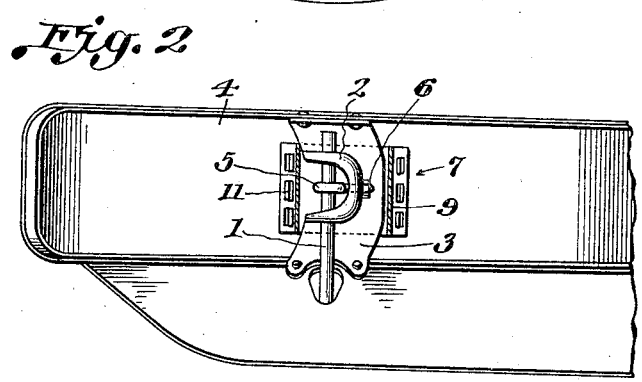
Figure 3:
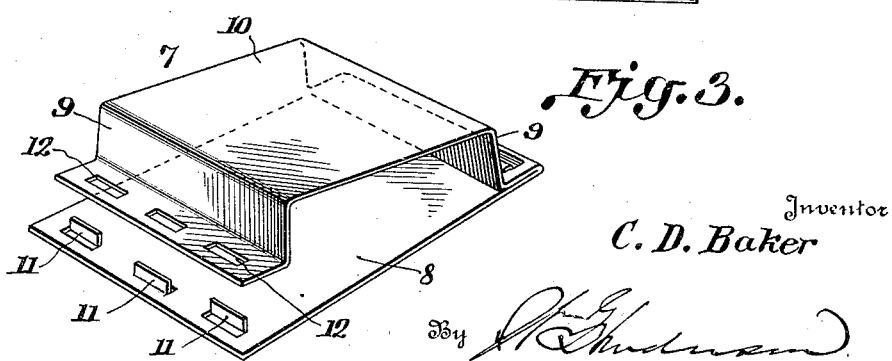

Figure 1 is a side elevation of the forward portion showing the mud-guard or fender and parts of the bracket and clamp in section, Figure 2 is a bottom plan view with the guard or shield in section on the line 2—2 of Figure 1, Figure 3 is a perspective of the guard or shield with one end separated from the base and partly raised.

In the drawing the numeral 1 designates the rod or bracket passed through the clamp 2 having its base plate 3 attached to the mud-guard 4 and secured in place by the eye-bolt 5 and nut 6 as commonly used on the Ford type of car.

The shield or guard designated by the numeral 7 comprises a base plate 8 adapted to be slipped between the fender and the base-plate 3 of the clamp 2 and provided at its ends with walls 9 which lie to the front and rear of the fender clamp and which are connected one to the other by a bottom plate 10 which lies beneath the fender clamp and bracket and thus is formed a housing which is supported from the base-plate of the clamp and encloses the clamp and bracket so that no part of the clamp will contact with the wheel tire in up and down movement of the fender and the possibility of puncturing the tire from such contact is avoided; and the housing also prevents a non-skid chain when used from catching and entangling with any part of the bracket and clamp. As the guard housing is supported from the base-plate of the clamp by passing between said plate and fender no bolts and nuts are necessary for its support which are liable to rust and become clogged by dirt, thus making it more difficult to remove the guard or shield when desired. Furthermore a broad bearing is afforded by the base of the guard resting on the base-plate of the clamp and thus stability and non-shifting of the guard is provided. In the preferred construction of the guard, when made in two parts, the base plate and the end walls are joined together by struck-up tongues 11 on one part and registering openings 12 formed in the other part to receive the tongues so that they may be turned down to fasten the two parts together. This forms an ideal construction for simplicity and ease of installation and efficient encasing of the fender clamp to guard against the objectionable occurrences mentioned. In forming the tongues or lips 11 it is preferred to strike-up the same as shown so that one or more may be bent outwardly and some inwardly as indicated in Figure 3 of the drawing, and thus afford a wider range of connection between the two parts.

I have illustrated and described the preferred details of construction of the various parts but changes can be made therein and essential features retained.

Having described my invention and set forth its merits what I claim is:

1. An automobile fender-clamp guard comprising a plate adapted to be inserted between the fender and clamp base-plate and rest upon and be supported by the latter, a bottom plate, and end walls connecting the top and bottom plates of the guard, said end walls positioned to lie to the front and rear of the fender-clamp and the bottom plate to extend beneath the clamp.

2. An automobile fender-clamp guard comprising two oppositely disposed plates, one adapted to be inserted between the fender and its clamp base-plate and supported by the latter and the other to extend beneath the clamp, end walls extending from one plate to the other and positioned to lie to the front and the rear of the fender-clamp, and means fastening one guard plate to the other.

3. An automobile fender-clamp guard comprising two oppositely disposed plates, one adapted to be inserted between the fender and its clamp base-plate and be supported by the latter and the other to extend beneath the clamp, end walls extending from one plate to the other and positioned to lie to the front and the rear of the fender-clamp, and lips struck-up from one member of the guard and passing through openings in the other member to fasten the two together.

In testimony whereof I affix my signature in presence of two witnesses.

CHARLES D. BAKER.

Witnesses:
H. W. HASELDEN,
E. L. TAYLOR.